United States Patent
Kundu et al.

(10) Patent No.: US 7,353,464 B1
(45) Date of Patent: Apr. 1, 2008

(54) HIERARCHICAL DATA NAVIGATION TOOL POPULATED BY A WEB SERVICE

(75) Inventors: Abhijit Kundu, Kirkland, WA (US); Brian Burdick, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 467 days.

(21) Appl. No.: 10/113,101

(22) Filed: Apr. 1, 2002

(51) Int. Cl.
*G06F 3/048* (2006.01)

(52) U.S. Cl. .................... 715/853; 715/854; 707/10; 709/217

(58) Field of Classification Search ........ 715/853–854; 707/10; 709/217
See application file for complete search history.

(56) References Cited

U.S. PATENT DOCUMENTS

| | | | |
|---|---|---|---|
| 5,644,740 A * | 7/1997 | Kiuchi ........................ 715/853 |
| 5,701,137 A | 12/1997 | Kiernan et al. |
| 5,838,319 A | 11/1998 | Guzak et al. |
| 5,923,328 A | 7/1999 | Griesmer |
| 5,926,818 A | 7/1999 | Malloy |
| 6,055,515 A | 4/2000 | Consentino et al. |
| 6,072,490 A | 6/2000 | Bates et al. |
| 6,078,327 A | 6/2000 | Liman et al. |
| 6,104,400 A | 8/2000 | Halachmi et al. |
| 6,226,577 B1 | 5/2001 | Yeo |
| 6,247,020 B1 * | 6/2001 | Minard ..................... 707/104.1 |
| 6,271,846 B1 | 8/2001 | Martinez et al. |
| 6,314,424 B1 * | 11/2001 | Kaczmarski et al. .......... 707/10 |
| 6,314,426 B1 * | 11/2001 | Martin et al. ................ 707/100 |
| 6,330,596 B1 * | 12/2001 | Stuckman et al. .......... 709/219 |
| 6,359,635 B1 * | 3/2002 | Perttunen .................... 715/834 |
| 6,499,036 B1 * | 12/2002 | Gurevich ................ 707/103 R |
| 6,635,089 B1 * | 10/2003 | Burkett et al. .............. 715/513 |
| 6,675,202 B1 * | 1/2004 | Perttunen .................... 709/217 |
| 2001/0042186 A1 * | 11/2001 | Iivonen et al. .............. 711/207 |
| 2002/0070953 A1 | 6/2002 | Barg et al. |
| 2003/0105771 A1 * | 6/2003 | Tiefenbrun et al. ..... 707/103 R |
| 2003/0110236 A1 * | 6/2003 | Yang et al. ................. 709/219 |

OTHER PUBLICATIONS

Wolber et al., "Exposing Document Context in the Personal Web," International Conference on Intelligent User Interfaces, 2002, pp. 151-158, ACM Press, New York, USA.

* cited by examiner

*Primary Examiner*—Weilun Lo
*Assistant Examiner*—Sara Hanne
(74) *Attorney, Agent, or Firm*—Senninger Powers LLP

(57) ABSTRACT

A method of navigating data associated with a plurality of nodes in a hierarchy stored in a database. The nodes are organized in a plurality of levels of the hierarchy where each node has a label. Software of the invention requests and receives a set of labels associated with one or more nodes in one or more levels in the hierarchy from the database. The software displays a visual representation of the hierarchy to a user including the received labels. A user select a plurality of the displayed labels from any level in the hierarchy to process data associated with the nodes corresponding to the selected labels.

30 Claims, 8 Drawing Sheets

FIGURE 1A
NETWORK/SERVICE/SITE/DOMAIN ▽
FIGURE 1B
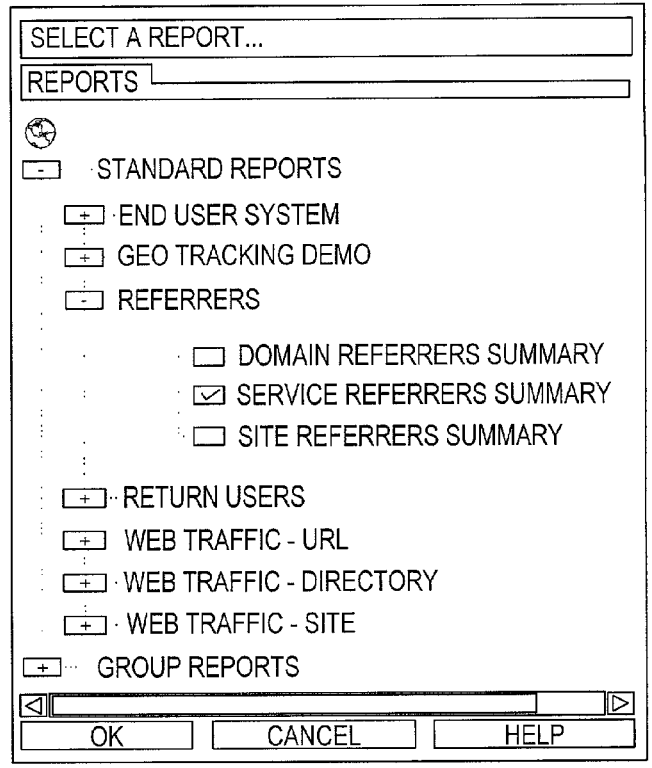
FIGURE 1C
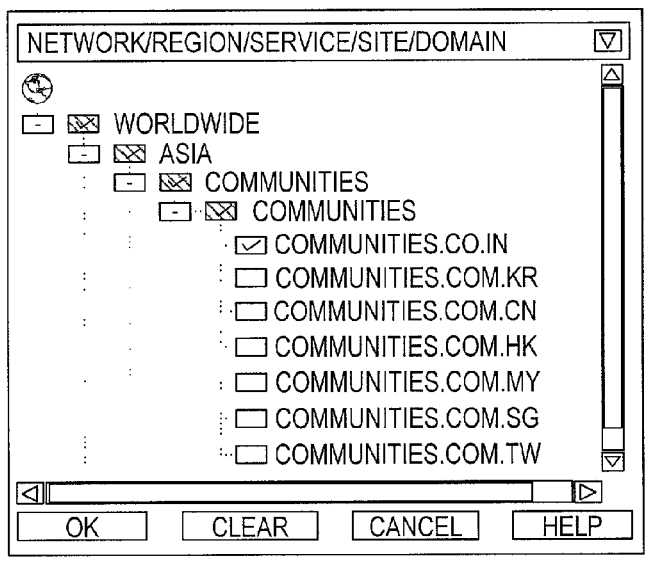

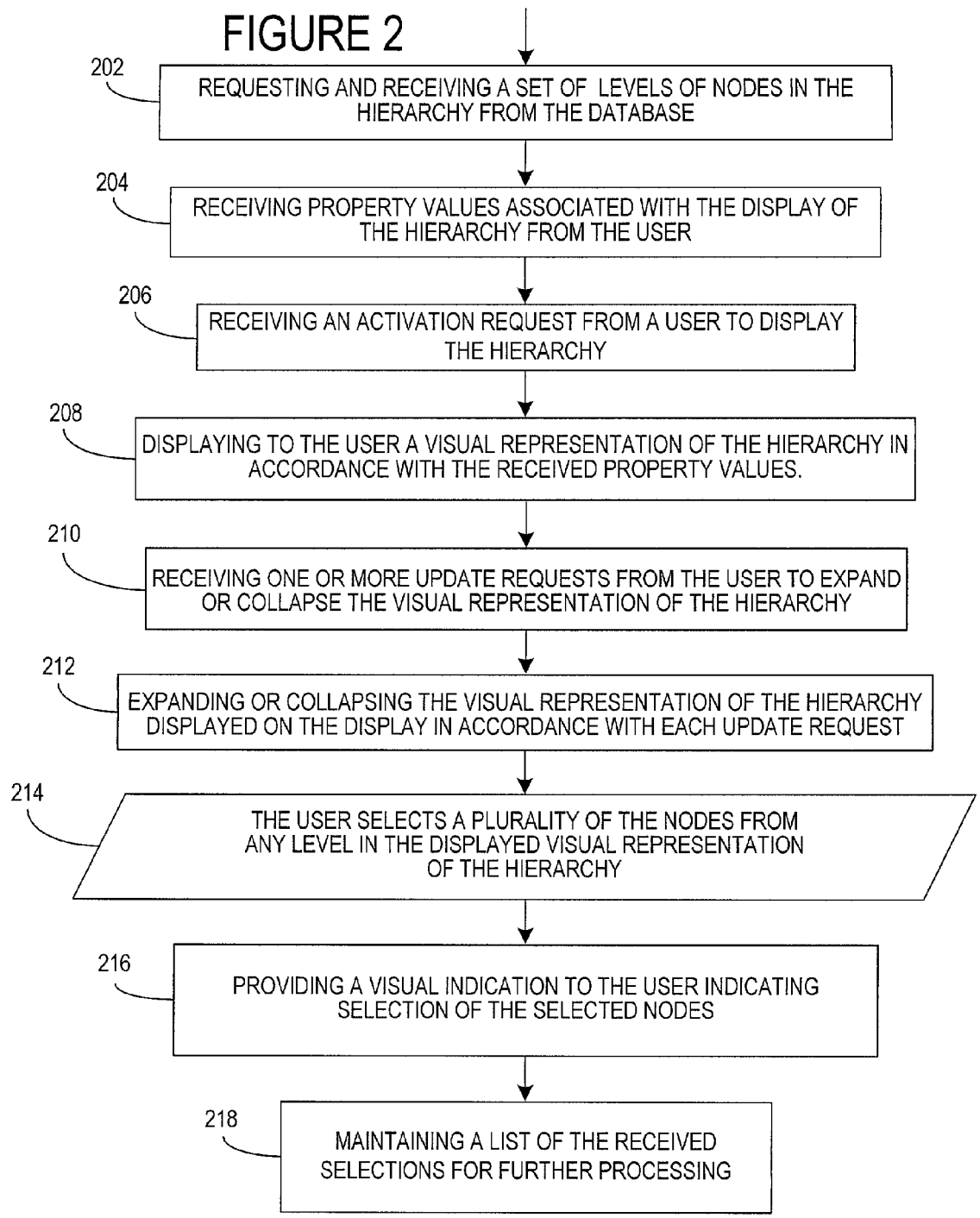

HIERARCHICAL DATA NAVIGATION TOOL POPULATED BY A WEB SERVICE

TECHNICAL FIELD

The present invention relates to the field of data navigation. In particular, this invention relates to navigating hierarchies of large data sets.

BACKGROUND OF THE INVENTION

Databases storing large amounts of data (e.g., a terabyte of data) are difficult to navigate. Some prior art database navigation techniques and data filtering techniques require large amounts of data to be downloaded. For databases in which the data is organized in a hierarchy, a visual representation of the hierarchy populated by a web service is desired to simplify the navigation and reduce the amount of data downloaded during filtering.

In some prior art user interfaces, such as those written using a hypertext markup language (HTML) through which members of a hierarchy need to be selected, the user interfaces load all of the data in the hierarchy prior to display of the hierarchy. For hierarchies with large data sets, the display of the hierarchy appears slow and unresponsive to a user. Further, in some prior art systems, users are generally limited to selecting one node out of the hierarchy or one value out of series of correlated list boxes. These prior art systems do not allow users to select multiple nodes at any level in the hierarchy. In addition, some prior art user interfaces displaying the hierarchy lack the ability to visually represent at a parent level that a node beneath the parent level is selected.

For these reasons, a system for iteratively navigating a data hierarchy via a web service is desired to address one or more of these and other disadvantages.

SUMMARY OF THE INVENTION

The invention is directed to navigating hierarchies of large data sets. In particular, a computer system executes software routines of the invention to populate a platform-independent window control by iteratively retrieving labels associated with one or more nodes in a hierarchy selected by a user. The software routines of the invention are executed to request and receive the labels via a web service and display the labels as part of the hierarchy of nodes. In this manner, the invention prevents a large amount of data from being retrieved at once. The invention also allows a user to select multiple nodes at any level in the hierarchy by selecting the labels corresponding to the nodes. The software routines of the invention visually represent that a node beneath a parent node is selected. Data associated with the nodes corresponding to the selected labels can be retrieved by software of the invention for further processing.

In accordance with one aspect of the invention, a method navigates data associated with a plurality of nodes in a hierarchy stored in a database. The nodes are organized in a plurality of levels of the hierarchy where each of the nodes has a label. The method includes requesting and receiving a set of labels associated with one or more nodes in one or more levels in the hierarchy from the database. The method also includes displaying to a user a visual representation of the hierarchy including one or more of the labels from the received set of labels. The user selects a plurality of the displayed labels from any level in the displayed visual representation of the hierarchy to process data associated with the nodes corresponding to the selected, displayed labels.

In accordance with another aspect of the invention, a method navigates data in a computer system having a graphical user interface including a display and a user interface selection device. The data is associated with a plurality of nodes in a hierarchy stored in a database. The nodes are organized in a plurality of levels of the hierarchy where each of the nodes has a label. The method includes requesting and receiving a set of labels associated with one or more nodes in one or more levels in the hierarchy from the database. The method further includes receiving an activation request from a user via the user interface selection device to display the receiving the received set of labels as a hierarchy. The method displays to a user a visual representation of the hierarchy on the display in response to the received activation request. The displayed hierarchy includes one or more of the labels from the received set of labels. The user selects a plurality of the displayed labels from any level in the displayed visual representation of the hierarchy via the user interface selection device to process data associated with the nodes corresponding to the selected, displayed labels.

In accordance with yet another aspect of the invention, a computer-readable medium has computer-executable components for navigating data. The data is associated with a plurality of nodes in a hierarchy stored in a database. The nodes are organized in a plurality of levels of the hierarchy where each of the nodes has a label. The components include a service component, a user interface component, and a list component. The service component requests and receives a set of labels associated with one or more nodes in one or more levels in the hierarchy from the database. The user interface component displays to a user a visual representation of the hierarchy including one or more of the labels from the received set of labels requested and received by the service component. The list component allows the user to select a plurality of the displayed labels from any level in the visual representation of the hierarchy displayed with the user interface component to process data associated with the nodes corresponding to the selected, displayed labels.

In accordance with yet another aspect of the invention, a computer-readable medium stores a data structure for navigating data. The data is associated with a plurality of nodes in a hierarchy stored in a database. The nodes are organized in a plurality of levels of the hierarchy. Each of the nodes has a label. The data structure includes a service field, a user interface field, and a list field. The service field stores a set of labels representing one or more nodes in one or more levels in the hierarchy. The set of labels is received from the database. The user interface field stores one or more of the labels from the set of labels stored in the service field. The one or more of the labels stored in the user interface field are displayed to the user in a visual representation of the hierarchy. The list field stores a plurality of the one or more labels stored in the user interface field. The user selects the plurality from any level in the visual representation of the hierarchy to process data associated with the nodes corresponding to the selected plurality.

Alternatively, the invention may comprise various other methods and apparatuses.

Other features will be in part apparent and in part pointed out hereinafter.

BRIEF DESCRIPTION OF THE DRAWINGS

FIG. 1A is an exemplary embodiment of a de-activated pop-up window displaying a path for a hierarchy.

FIG. 1B is an exemplary embodiment of a window displaying a hierarchy for report selection.

FIG. 1C is an exemplary embodiment of a pop-up window displaying a hierarchy with selected nodes.

FIG. 2 is an exemplary flow chart illustrating operation of the tree control software.

Corresponding reference characters indicate corresponding parts throughout the drawings.

DETAILED DESCRIPTION OF THE INVENTION

Figure 3A:
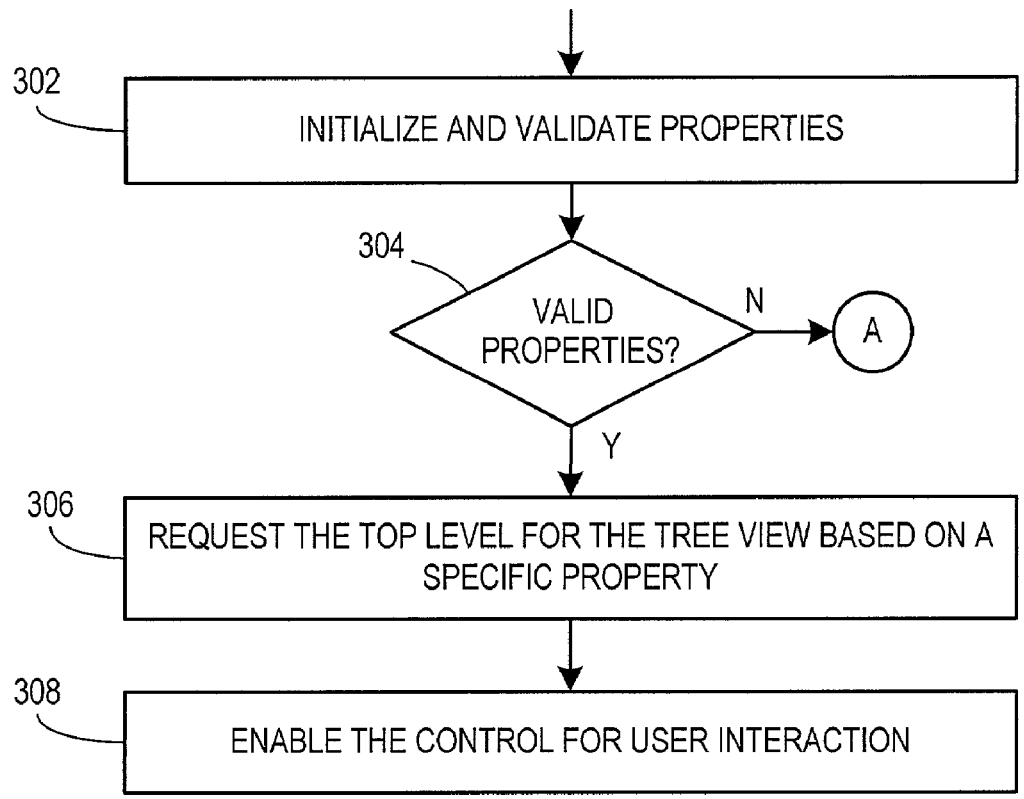
FIG. 3A is an exemplary flow chart illustrating initialization and validation of the tree control software.

The invention provides software to populate a platform-independent hierarchical data navigation tool on demand by a web service. In one embodiment, the invention is a multi-select tree control with web service based population implemented as a hypertext markup language (HTML) component (HTC) for use by a web browser. The HTC communicates with a backend server that has access to a database to request, receive, and process data stored in a database. In an alternative embodiment, the database is accessible directly by the software routines of the invention. The software routines of the invention operate with any data stored in the database corresponding to nodes organized as levels in a hierarchy. Each node in the hierarchy has a label corresponding to that node (see FIG. 1B and FIG. 1C).

The tree control software routines of the invention are applicable for navigating various types of hierarchical data. For example, the software routines can be executed by a computing device to analyze web usage data, to select reports, or to browse the Internet with a mobile device. The software routines of the invention provide client side error trapping by including a validation routine to determine if the current state of the HTC is valid. The tree control software provides a user with the ability to select a plurality of nodes from any level in the hierarchy. In addition, the tree control software is extensible for various scenarios in that a software developer or other users can designate an initial set of nodes as a default selection. The invention includes a scaleable method for populating large amounts of data organized as a hierarchy into a user interface control that does not have a dependency on server side code for the web page (e.g., application service provider code). The control is populated at each level in the hierarchy iteratively through a web service such as a simple object access protocol (SOAP) or through a static file such as an extensible markup language (XML) file. The iteration or recursion via the web service allows the control to load the data in response to user input. In one embodiment, the invention is operable with a browser.

The invention is operable with any database in which the data is organized as a hierarchy, or otherwise categorized into different levels. Population on demand allows the hierarchy to be scaled indefinitely as the control only loads data when necessary. In this manner, the invention prevents large amounts of data from being downloaded in response to input from the user. In one exemplary embodiment, the invention is operable with a database storing in excess of a terabyte of data. The object model of the control iteratively retrieves a label associated with a node in the hierarchy through a web service such as SOAP. The object model eliminates all dependencies on client side data access controls and also represents a re-usable architecture that is not specific to any one web site. In one embodiment, the invention allows the control to be initially instantiated with a static file fragment to reduce web service calls and hence improve responsiveness.

In the browser embodiment, the tree control software is implemented as an HTC residing in a pop-up object with a well-formed object model that is self-contained and independent. The tree control software is lightweight in that it is downloaded as a script file. However, after instantiation, the tree control software operates like a binary control while not having any of the security problems associated with a binary control (such as an ActiveX control). In an embodiment where the tree control software employs a pop-up object, a pop-up window appears when a user selects an option (see FIGS. 1A-1C). In an embodiment where the pop-up window appears in response to the user clicking a mouse button, the window remains visible until the mouse button is released. A pop-up window minimizes the use of the display and enables the tree control software to display enormous XML documents without consuming the entire display area on the display.

Alternatively, the invention could be implemented using one or more applets, for example, written in Java. In this alternative embodiment, the applets are downloaded to and executed by the user's computer. In other embodiments, the invention is implemented with JavaScript or with an object-oriented programming language.

The tree control software of the invention allows a user to select multiple items or nodes from a displayed hierarchy at different levels of the hierarchy, as described in greater detail with reference to FIG. 2. In particular, the user can select multiple tree nodes at the same parent level, to select multiple tree nodes at different parent levels, or to select a single tree node. User selection can be enabled at any level of the tree. The user selects a node by selecting the label associated with the node in the hierarchy displayed to the user. The invention visually represents that a node beneath the parent node is selected using a tri-state selection display. The first state is that the node is not selected, the second state is that the node is selected, and the third state is that there are descendants of the node in question which are selected. Such a tri-state selection provides scalability to determine where nodes are selected. The tri-state selection display acts as a "breadcrumb" trail to the selected nodes to visually show the entire path of selection from a root node to each selected node.

In one embodiment, the tri-state selection display is a checkbox. In this embodiment, a checkbox appears at every level of the tree to enable users to select any node. A user has the ability to make multiple selections by selecting multiple checkboxes. When a user selects a node which has a parent node, the parent node checkbox becomes "grayed-out" indicating that the parent node has a descendant node which has been selected. The grayed-out indicator represents the path to all selected nodes. In one embodiment, selected levels within the displayed hierarchy are represented internally with a bit mask. A "1" for a level in the bit mask indicates that at least one item in that level has been selected. A "0" for a level in the bit mask indicates that no items in that level have been selected.

Referring to the figures, FIGS. 1A-1C illustrate exemplary user interface embodiments of the tree control software of the invention. FIG. 1A shows a de-activated pop-up window displaying a hierarchical path "Network/Service/Site/Domain." Upon activation of the pop-up window in response to a user selecting the down-arrow in FIG. 1A, a computing device executes the tree control software to display a visual representation of the hierarchy as a tree view in a pop-up window on the computing device. FIG. 1B shows a window displaying a visual representation of a hierarchy for selecting reports as a tree view. In this example, the reports for selection in each descending level in the hierarchy have greater specificity than the preceding level. In this example, the globe icon corresponds to a root node at a root level of the hierarchy. The labels "Standard Reports" and "Group Reports" represent nodes in a level of the hierarchy immediately beneath the root level. The node represented by the label "Standard Reports" has several child nodes represented by the labels "End User Systems," "Geo Tracking Demo," "Referrers," "Return Users," "Web Traffic—URL," "Web Traffic—Directory," and "Web Traffic—Site." The node represented by the label "Referrers" has three selectable child nodes represented by the labels "Domain Referrers Summary," "Service Referrers Summary," and "Site Referrers Summary." The checkbox located proximal to each of these three labels indicates that the nodes corresponding to the labels are selectable. The nodes corresponding to the labels have data associated with the node. For example, the node with the label "Domain Referrers Summary" has a report that summarizes the domain referrers to a specific web site. In this exemplary embodiment, the report is displayed to the user after the user selects the checkbox next to the "Domain Referrers Summary" label and presses an "ok" button. While the software routines of the invention provide the ability for nodes to be selected by the user, a client application program or other application program may use the selection to implement various functionality such as retrieving data associated with the selected nodes.

FIG. 1C shows a pop-up window displaying a visual representation of a hierarchy with selected nodes as indicated by checkmarks next to labels for the selected nodes. In this example, the hierarchy corresponds to a path of "Network/Region/Service/Site/Domain." The node "communities.co.in" has been selected as indicated by the solid checkmark in the box proximal to the text for the node. In this embodiment, a solid checkmark near a specific node indicates that the specific node and any child nodes of the specific node have been selected. In contrast, a grayed-out checkmark near a node indicates that the node is in a path from a root node to a selected node. In the example of FIG. 1C, grayed-out checkmarks from the root node, "Worldwide," to the selected node indicate the path from the root node to the selected node.

Referring next to FIG. 2, an exemplary flow chart illustrates operation of the tree control software. The method illustrated in FIGS. 2-6 is operable in a computer system having a graphical user interface including a display and a user interface selection device. Those skilled in the art will note that the method illustrated in FIGS. 2-6 may be implemented as computer-executable instructions on one or more computer-readable media executed by or combined with various hardware components, software components, or both within the scope of the invention. For example, the tree control software may be downloaded as an HTML component, an applet written in Java or JavaScript, or as a plug-in for a browser. Further, a browser on a mobile computing device such as a cellular telephone or a personal digital assistant may execute the tree control software. In another example, the tree control software provides the ability to select nodes from a displayed hierarchy, while a client application program uses the selection to provide additional functionality (such as retrieving and displaying data associated with the selected nodes).

The tree control software of the invention provides a method of navigating data. The data is associated with a plurality of nodes in a hierarchy stored in a database. The nodes are organized in a plurality of levels of the hierarchy. The tree control software requests and receives a set of labels associated with one or more nodes in one or more levels in the hierarchy from the database at 202. In one embodiment, the tree control software requests and receives the set of labels via a network. In an embodiment of the invention in which the tree control software is configurable via at least one property, the tree control software receives at least one value for one or more properties associated with the display of the hierarchy at 204. The values for the properties may be set by a software developer for the tree control software, by the user of the tree control software, or by some other party. The tree control software requests at 202, receives at 204, and displays at 206 in accordance with the received property values. In an example referred to as "pre-populating," the tree control software populates the hierarchy prior to initial display of the hierarchy via a property (e.g., an XMLSourcePath property as described in Appendix A) specified by the user, developer, or other means.

The tree control software receives an activation request from the user at 206 to display the hierarchy. For example, the user transmits the activation request via a user interface selection device such as described with reference to FIG. 8. In the example of FIG. 1A, the user transmits the activation request by clicking on the down arrow in FIG. 1A. In response to the activation request received from the user, the tree control software displays to the user on a display at 208 a visual representation of the hierarchy including the set of one or more of the labels received from the database. In one embodiment, the display is associated with a computing device such as those described herein and elsewhere. For example, the display may be associated with a personal digital assistant (PDA), a cellular telephone, or a laptop computer. Further, the visual representation of the hierarchy may be displayed in a browser on the PDA, cellular telephone, or the laptop computer.

The tree control receives one or more update requests from the user at 210 to expand or collapse the visual representation of the hierarchy displayed on the display. For example, the user transmits the update requests via a user interface selection device such as described with reference to FIG. 8. For each of the update requests, the tree control expands or collapses the visual representation of the hierarchy displayed on the display at 212 in accordance with the update request. For example, the update request may specify to collapse a specific level. In response to this exemplary update request, the tree control software removes the nodes in that level from the display of the hierarchy.

The tree control software provides the user with the ability to select at 214 a plurality of the displayed labels from any level in the received set of labels in the displayed visual representation of the hierarchy to select the nodes corresponding to the selected labels. That is, the user selects a node by selecting the label associated with the node in the hierarchy. The tree control provides a visual indication to the user at 216 indicating selection of the selected nodes. The tree control locates the visual indication proximal to the selected labels in the visual representation of the hierarchy. In one embodiment (as seen in FIG. 1C), the visual indication includes a checkmark located adjacent to the text identifying each selected node. The tree control additionally locates a visual indication proximal to each node in a path from the root node to each of the selected nodes to indicate the path to each selected node. In the embodiment of FIG. 1C, the visual indication for each node in the path from the root to each selected node includes a grayed-out checkmark located adjacent to the text identifying each node.

The user may select a plurality of nodes where each of the selected nodes has one or more child nodes. Additionally, the user may select a plurality of nodes where each of the selected nodes has no child nodes and a plurality of the selected nodes have different parent nodes. That is, the user can select a node having parent node A, and select another node having parent node B. Further, the user may select both a node having one or more child nodes and a node having no child nodes.

The tree control software or other software maintains a list of the selected nodes for further processing at 218. For example, an application program may obtain the list of selected nodes to process data associated with the selected nodes by retrieving data associated with the selected nodes. In the exemplary embodiment of FIG. 1B, an application program or other software retrieves reports associated with the selected node "Service Referrers Summary." In the exemplary embodiment of FIG. 1C, an application program or other software retrieves statistics for web page access associated with the web site communities.co.in because of the checkmark in the box adjacent to the node label communities.co.in.

Referring next to FIG. 3A, an exemplary flow chart illustrates initialization and validation of the tree control software. The tree control software initializes one or more properties and validates values for the properties associated with the hierarchy at 302 as received from the user as described with reference to FIG. 2. The user may be the end user of the tree control, a software developer, or any other entity managing the organization or display of the hierarchy. If the property values are valid at 304, the tree control software requests the top level for the tree view at 306 based on a specified property value. For example, a "Parentnode" property value identifies the top level for the tree view (see Appendix A). The tree control software then enables itself for user interaction at 308 in anticipation of being activated by the user (see FIG. 2). If the initialization fails or if any of the properties are determined by the tree control software to be invalid, the tree control software raises an error and disables itself (see FIG. 3B). Connector A provides a link from FIG. 3A to FIG. 3B.

A value for a property may specify a maximum quantity of nodes or levels to request, a maximum quantity of nodes or levels to display, or both. The software developer or other user can select any, all, or a range of levels to request or display. For example, the value may indicate that X levels or no more than X levels are to be requested and/or displayed, where X is an integer value. In another example, the hierarchy may include ten levels, but the user can specify to display only levels two and three. Such a property value prevents large amounts of data from being requested or displayed at once.

Another value for a property may identify one or more nodes to exclude from requesting, displaying, or both. Another value for a property may specify an intermediate level to display between other levels within the hierarchy. For example, a user may wish to organize a set of names alphabetically even though the data is not organized alphabetically within the database. The user can specify that only the letters of the alphabet corresponding to the first letter of each last name in the database be displayed in the hierarchy. Another value for a property identifies a quantity of levels to request when requesting a set of one or more levels of one or more nodes in the hierarchy from the database. The user may request any number of levels of nodes with each request. For example, the user may request to view only the top level of the hierarchy with the first request, then the next three levels when expanding the displayed hierarchy with subsequent requests. Another value for a property allows user selection at or below a specific level. These properties and other exemplary properties are described in greater detail in Appendix A.

Figure 3B:
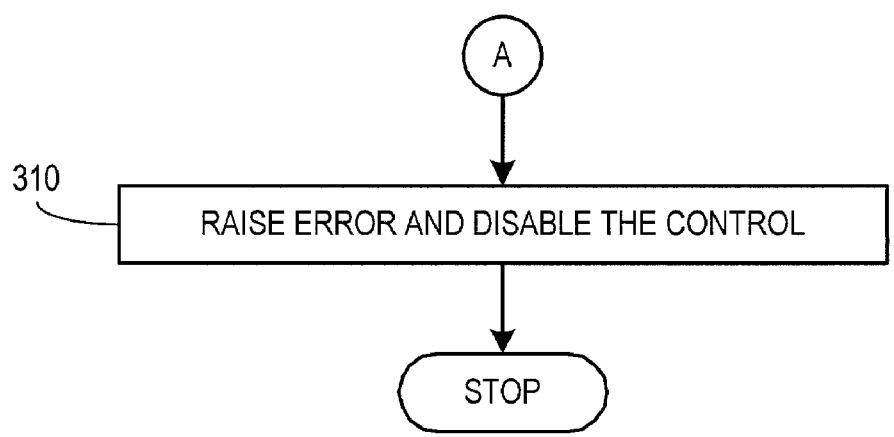
FIG. 3B is an exemplary flow chart illustrating an error response for the tree control software.

Referring next to FIG. 3B, an exemplary flow chart illustrates an error response for the tree control software. If the tree control software determines that a property value is invalid or otherwise detects an error, the tree control software raises an error at 310 and disables itself. In one embodiment, the tree control software may alert the user to the error by displaying a message in a pop-up window describing the error.

Figure 4A:
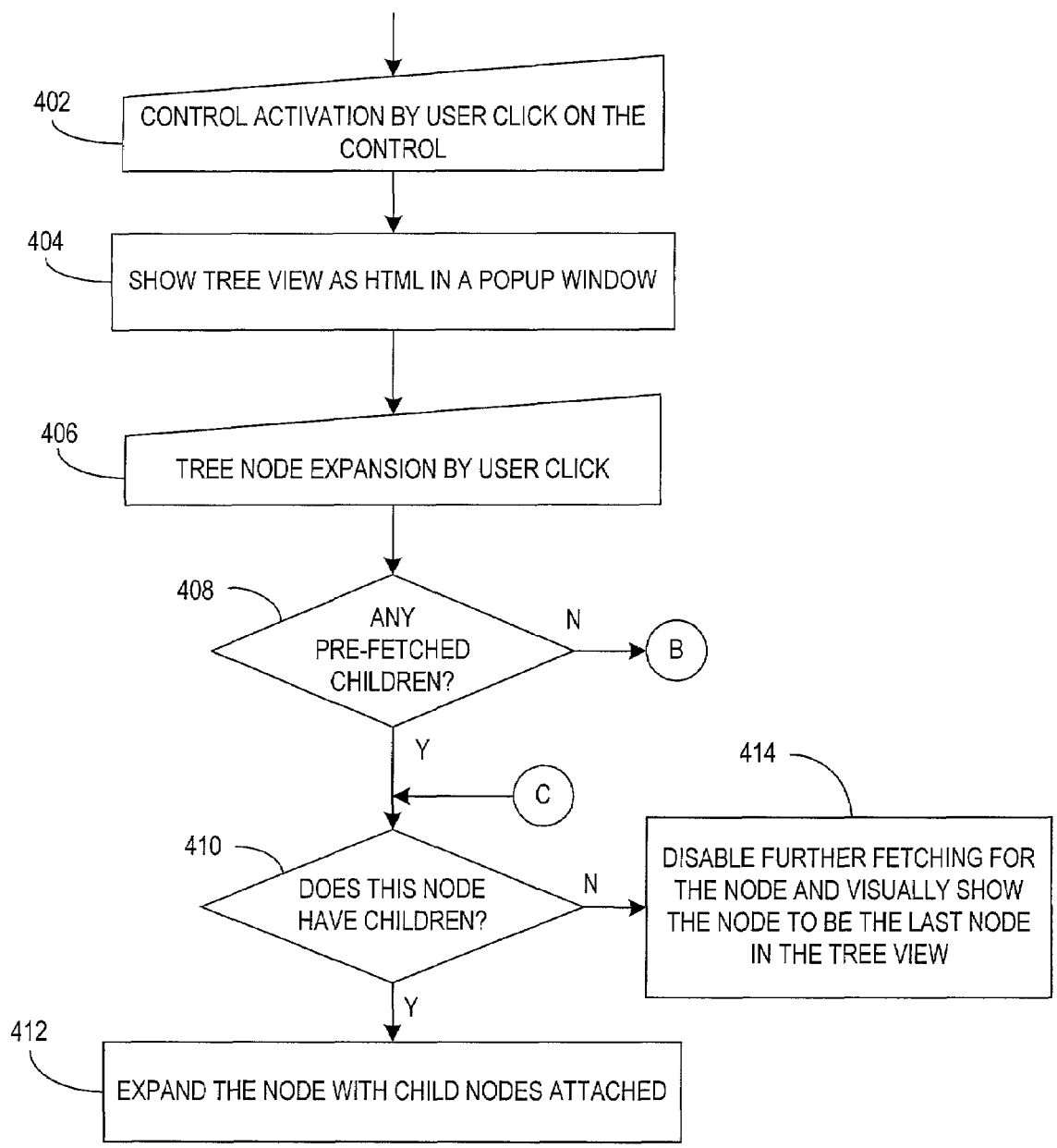
FIG. 4A is an exemplary flow chart illustrating tree control activation and tree node expansion.

Referring next to FIG. 4A, an exemplary flow chart illustrates tree control activation and tree node expansion. In response to control activation by the user at 402, the tree control software displays a visual representation of the hierarchy as a tree view in a pop-up window to the user at 404. In the embodiment of FIG. 1A, the control activation from the user includes the user selecting the down arrow to activate the pop-up window. The visual representation of the hierarchy may be displayed in any format. For example, the hierarchy may be displayed using a hypertext markup language (HTML).

Figure 4B:
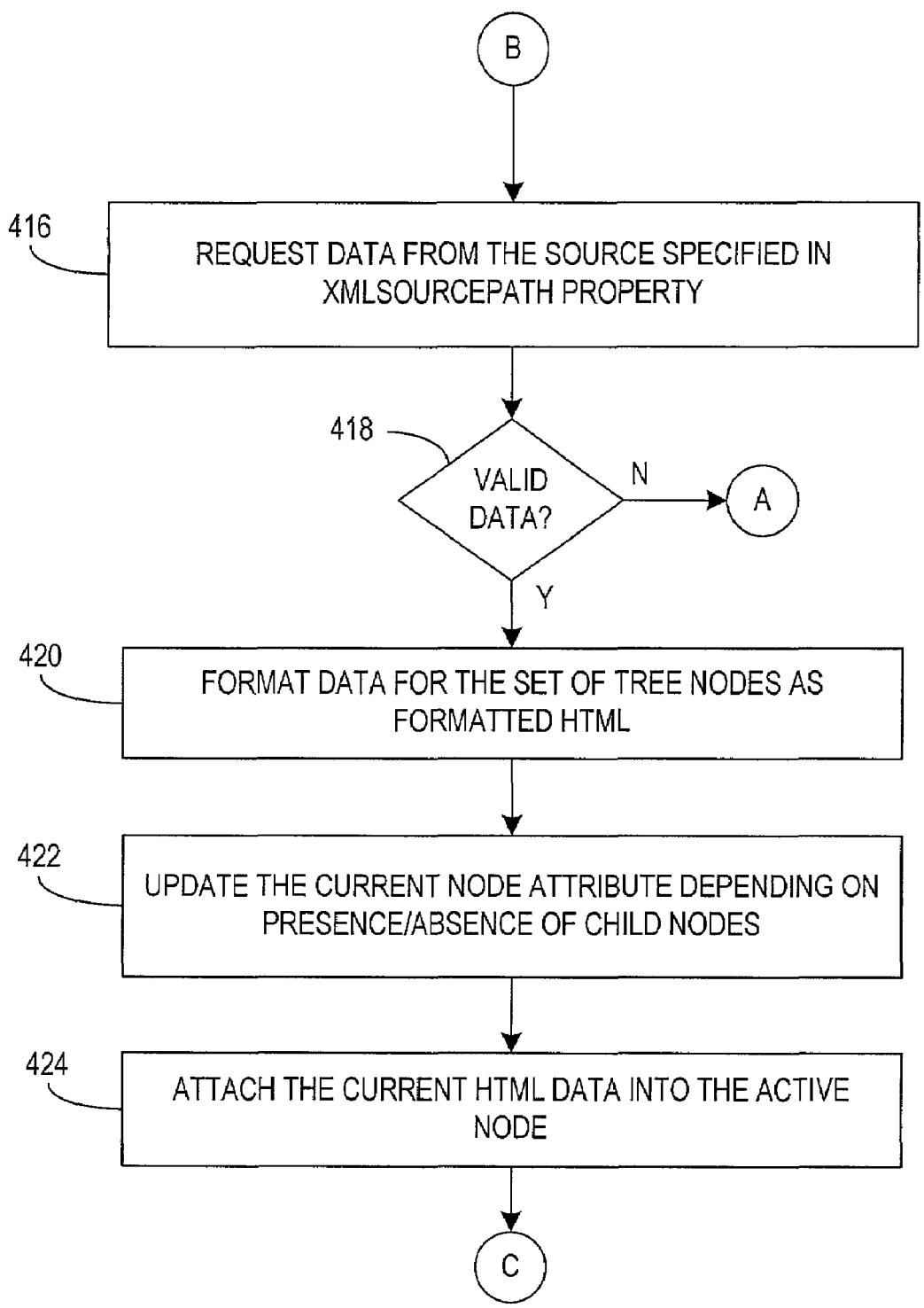
FIG. 4B is an exemplary flow chart illustrating requests for child nodes during tree node expansion.

In response to a tree node expansion request from the user at 406, the tree control software expands the visual representation of the hierarchy by displaying the labels for one or more levels of nodes below the node specified in the tree node expansion request. For example, the user may click on a label representing a specific node in the tree to display any child nodes of the specific node. In response to the tree node expansion request, the tree control software determines at 408 if the tree node software during a prior request fetched labels for any child nodes for the current level. If no child labels were pre-fetched, the tree node software requests and receives labels for a set of the child nodes as shown in FIG. 4B (see below). Connector B in FIG. 4A provides a link to FIG. 4B. If labels for the child nodes were pre-fetched, the tree control software determines at 410 if the specific node has any child nodes. If the specific node has child nodes, the tree control software expands the specific node with child nodes shown as attached to the specific node at 412. If the specific node does not have any child nodes, the tree control software disables further fetching for the specific node at 414 and visually shows the specific node to be the last node in the tree view. In response to a tree node collapse request (not shown) for a specific node, the tree control software removes any child nodes of the specific node from the displayed tree view of the hierarchy.

In the exemplary embodiments of FIG. 1B and FIG. 1C, the user generates a tree node expansion request by selecting the "+" symbol next to a specific node. Similarly, the user generates a tree node collapse request by selecting the "−" symbol next to a specific node.

Referring next to FIG. 4B an exemplary flow chart illustrates requests for child nodes during tree node expansion. If, in response to a tree node expansion request, no labels for any child nodes have been pre-fetched, the tree node software requests and receives labels for a set of the child nodes from the database. In one embodiment, the tree control software requests data from a source specified in a XMLSourcepath property (see Appendix A) at 416. If the tree control software determines at 418 that the value for the XMLSourcepath property is valid, the tree control software formats the received data for the set of tree nodes as formatted HTML at 420. If the value for the XMLSourcepath property is invalid, the tree control software raises an error and disables itself (see FIG. 3B). Connector A provides a link from FIG. 4B to FIG. 3B. The tree control software updates attributes for the specific node (i.e., the node targeted for expansion by the user) at 422 depending on the presence or absence of child nodes for the specific node. The tree control software attaches the formatted HTML data into the specific node at 424. Operation continues with a determination of child nodes at 410 in FIG. 4A as indicated by connector C linking FIG. 4B with FIG. 4A.

Figure 5:
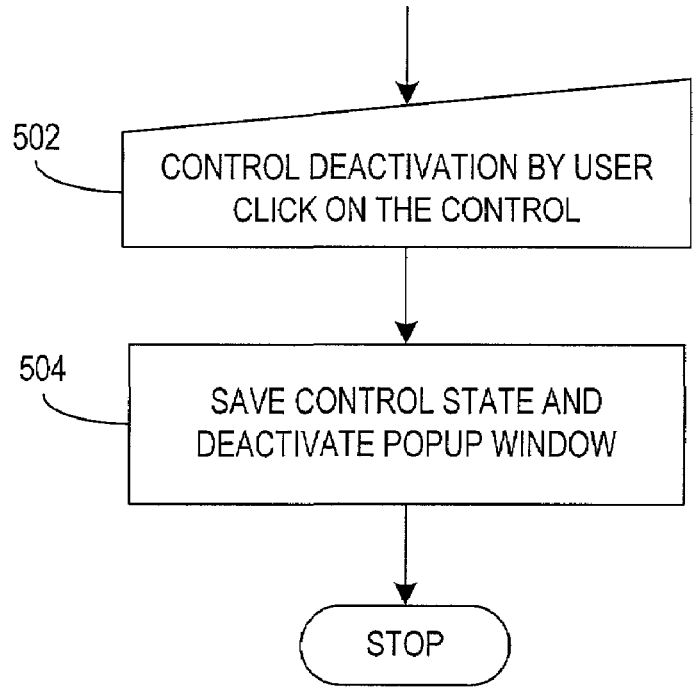
FIG. 5 is an exemplary flow chart illustrating tree control de-activation.

Referring next to FIG. 5 an exemplary flow chart illustrates tree control de-activation. The tree control software receives a de-activation request from the user at 502 to remove the visual representation of the hierarchy from the display. For example, the user transmits the de-activation request via a user interface selection device such as described with reference to FIG. 8. In the example of FIG. 1C, the user transmits the de-activation request by clicking on the down arrow next to the "Network/Region/Service/Site/Domain" path in FIG. 1C. In response to the de-activation request received from the user, the tree control software saves state information associated with the pop-up window at 504 and de-activates the pop-up window in response to user input.

Figure 6:
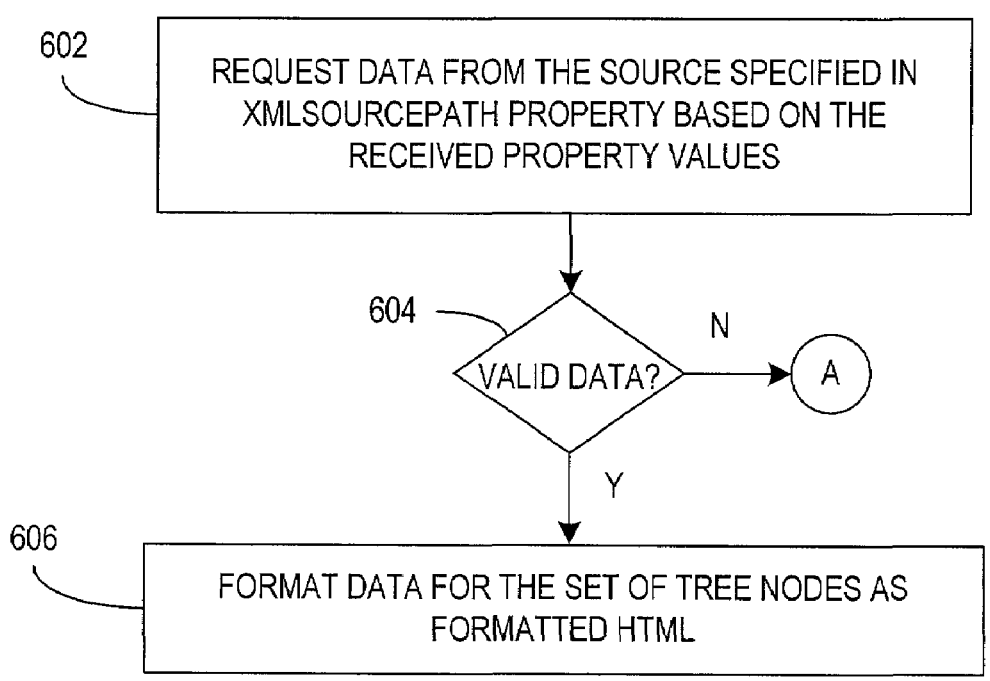
FIG. 6 is an exemplary flow chart illustrating requests for the top-level tree view during initialization and validation of the tree control software.

Referring next to FIG. 6, an exemplary flow chart illustrates requests for the top-level tree view during initialization and validation of the tree control software. The tree node software requests and receives a set of the nodes for the top-level tree view from the database. In one embodiment, the tree control software requests data from a source specified in a XMLSourcepath property (see Appendix A) at 602. If the tree control software determines that the value for the XMLSourcepath property is valid at 604, the tree control software formats the received data at 606 for the set of tree nodes as HTML. If the value for the XMLSourcepath property is invalid, the tree control software raises an error and disables itself. Connector A provides a link from FIG. 6 to FIG. 3B.

Figure 7:
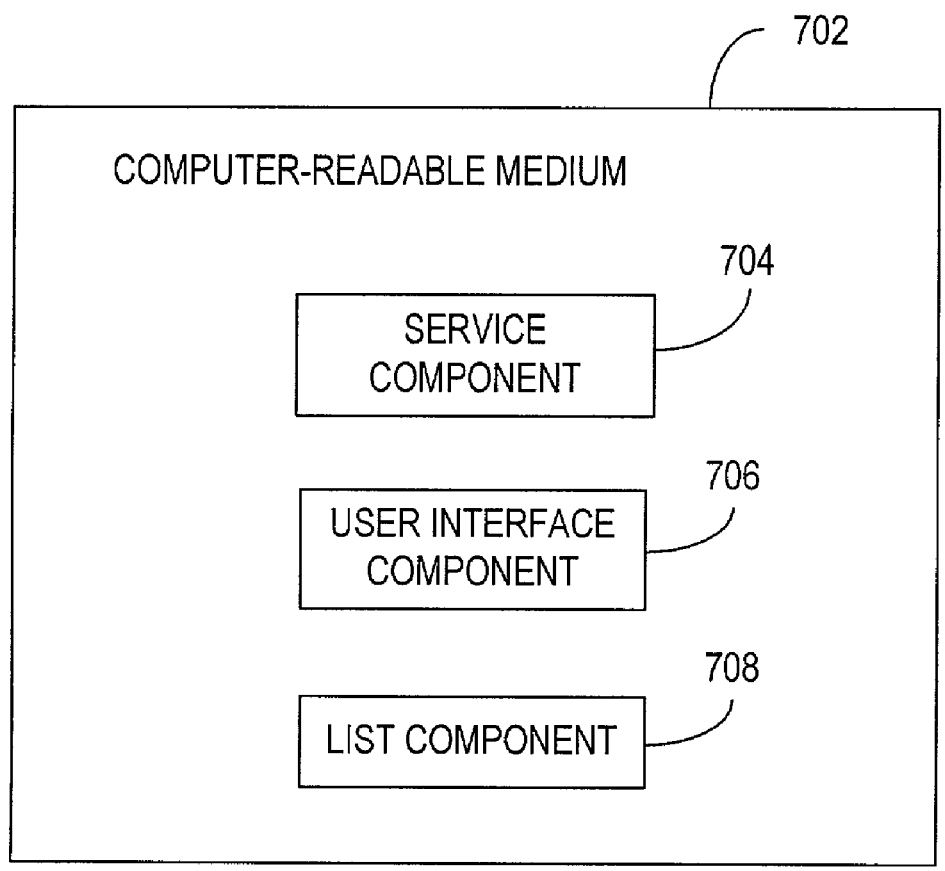
FIG. 7 is a block diagram illustrating an exemplary computer-readable medium on which the invention may be stored.

Referring next to FIG. 7, a computer-readable medium 702 has computer-executable components for navigating data. The data is associated with a plurality of nodes in a hierarchy stored in a database. The nodes are organized in a plurality of levels of the hierarchy. The components include a service component 704, a user interface component 706, and a list component 708. The computing device executing the service component 704 requests and receives a set of labels associated with one or more nodes in one or more levels in the hierarchy from the database. The user interface component 706 displays to a user a visual representation of the hierarchy including one or more of the labels requested and received by the service component 704. The list component 708 allows the user to select a plurality of the displayed labels from any level in the visual representation of the hierarchy displayed with the user interface component 706 for processing data associated with the selected nodes corresponding to the selected, displayed labels. Further, the service component 704 retrieves the data associated with the nodes selected via the list component 708. The user interface component 706 displays the retrieved data.

In an alternative embodiment of FIG. 7, the computer-readable medium 702 stores a data structure for navigating data. The data structure includes fields corresponding to the components illustrated in FIG. 7. That is, a service field corresponds to the service component 704, a user interface field corresponds to the user interface component 706, and a list field corresponds to the list component 708. The service field stores a set of labels representing one or more nodes in one or more levels in the hierarchy. The set of labels is received from the database. The user interface field stores one or more of the labels from the set of labels stored in the service field. The one or more of the labels stored in the user interface field are displayed to the user in a visual representation of the hierarchy. The list field stores a plurality of the one or more labels stored in the user interface field. The user selects the plurality from any level in the visual representation of the hierarchy to process data associated with the nodes corresponding to the selected plurality. In response to a request from the user to expand or collapse the visual representation of the hierarchy, at least one label is added to or deleted from, respectively, the set of labels stored in the service field and/or the user interface field.

In one exemplary embodiment, the tree control software is implemented in JavaScript using HTML component-based object modeling to define self-contained controls. The tree control software uses the popup object of a browser and uses software to load data from a web service or a static XML file located in a web server. The tree control software is generated using standard dynamic HTML. The tree control software exposes a set of configurable properties and callable methods that can be used for implementing functions. In this embodiment, the user of the tree control software needs to download only the tree control software as an HTML component file to define the controls object model and binding with consumer elements, as an associated JavaScript file which contains other code and some image files to give the tree control a visual appeal. The user does not need to separately install any software on a user computer.

Figure 8:
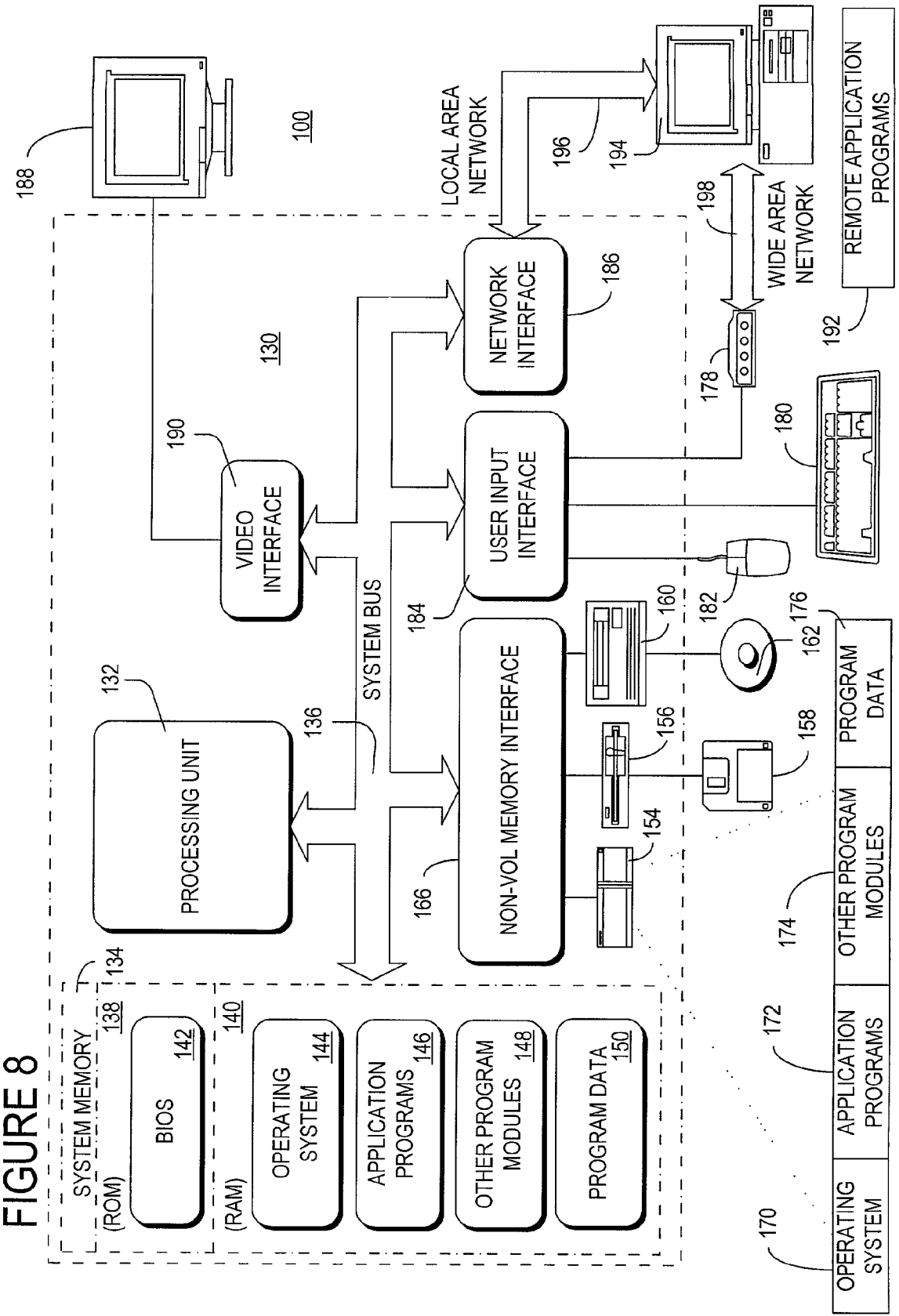
FIG. 8 is a block diagram illustrating one example of a suitable computing system environment on which the invention may be implemented.

FIG. 8 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 8 illustrates operating system 144, application programs 146, other program modules 148, and program data 150.

The computer 130 may also include other removable/non-removable, volatile/nonvolatile computer storage media. For example, FIG. 8 illustrates a hard disk drive 154 that reads from or writes to non-removable, nonvolatile magnetic media. FIG. 8 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 8, provide storage of computer readable instructions, data structures, program modules and other data for the computer 130. In FIG. 8, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 8 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 8 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 130 executes computer-executable instructions such as those illustrated in FIGS. 2-6 to navigate a hierarchy of data stored in a database. The data is associated with a plurality of nodes in the hierarchy where the nodes are organized in a plurality of levels of the hierarchy. Each of the nodes has a label. The computer-executable instructions request and receive a set of labels associated with one or more nodes in one or more levels in the hierarchy from the database. Computer 130 executes computer-executable instructions to display to a user a visual representation of the hierarchy including one or more of the labels from the received set of labels. The user selects a plurality of the displayed labels from any level in the displayed visual representation of the hierarchy to process data associated with the nodes corresponding to the selected, displayed labels.

The following example illustrates how the tree control software of the invention can be populated with a directory of names and addresses. In this example, the database includes the following columns and field values: ID (Integer), Taxonomy (Directory), TaxonomyLevel (Letter), Selectable (0), MultiSelect (0), NextLevel (LastName), NumLevels (1), and Value (A). Actions are defined based on the values for ID retrieved from the tree control selection upon user selection. Upon initialization, the client application program defines the location/name of the web service from which to be populated. In this example, the tree control software allows node selection at any level in the hierarchy.

The browser or client application program downloads the tree control and initializes it in a user interface. The tree control makes a web service request such as shown below for a first level of data.

```
<SOAP-ENV:Envelope
 xmlns:SOAP-ENV="http://schemas.xmlsoap.org/soap/envelope/"
 SOAP-ENV:encodingStyle="http://schemas.xmlsoap.org/soap/encoding/">
  <SOAP-ENV:Body>
    <m:GetTreeXML xmlns:m="Some-URI">
      <Taxonomy>Directory</Taxonomy>
        <Level>Letter</Level>
        <Selected>All</Selected>
        <NumLevelsDownload>1</NumLevlesDownlaod>
    </m:GetTreeXML>
  </SOAP-ENV:Body>
</SOAP-ENV:Envelope>
```

The web service responds with a SOAP result for the "Letter" level such as shown below. The response includes the data and identifies whether or not the data should be selectable/multi-selectable, how many levels to download on the next request, and the next level to download.

```
<SOAP-ENV:Envelope
 xmlns:SOAP-ENV="http://schemas.xmlsoap.org/soap/envelope/"
 SOAP-ENV:encodingStyle=
 "http://schemas.xmlsoap.org/soap/encoding/"/>
  <SOAP-ENV:Body>
    <m:GetTreeXMLResponse xmlns:m="Some-URI">
      <Letters id="1">A</Letters>
      <Letters id="2">B</Letters>
      <Letters id="3">C</Letters>
      <Letters id="4">D</Letters>
      <Letters id="5">E</Letters>
      <Letters id="6">F</Letters>
      <Letters id="7">G</Letters>
      <Letters id="8">H</Letters>
      <Letters id="9">I</Letters>
      <Letters id="10">J</Letters>
      <Letters id="11">K</Letters>
      <Letters id="12">L</Letters>
      <Letters id="13">M</Letters>
      <Letters id="14">N</Letters>
      <Letters id="15">O</Letters>
      <Letters id="16">P</Letters>
      <Letters id="17">Q</Letters>
      <Letters id="18">R</Letters>
      <Letters id="19">S</Letters>
      <Letters id="20">T</Letters>
      <Letters id="21">U</Letters>
      <Letters id="22">V</Letters>
      <Letters id="23">W</Letters>
      <Letters id="24">X</Letters>
      <Letters id="25">Y</Letters>
      <Letters id="26">Z</Letters>
        <Selectable>0</Selectable>
        <MultiSelect>0</MultiSelect>
        <NextLevel>LastName</NextLevel>
        <NextNumLevelsDownload>1<NextNumLevelsDownload>
    </m:GetTreeXMLResponse>
  </SOAP-ENV:Body>
</SOAP-ENV:Envelope>
```

The user interactively navigates downward in the hierarchy and initiates a new service request by clicking the "plus" icon in the display. For this example, the user drills down on "S" and expands the hierarchy. In this embodiment, "drill down" functionality is distinct from node selection functionality. For example, in one embodiment, the client application program, not the tree control software, performs some action when a node is selected/checked.

```
<SOAP-ENV:Envelope
xmlns:SOAP-ENV="http://schemas.xmlsoap.org/soap/envelope/"
SOAP-ENV:encodingStyle="http://schemas.xmlsoap.org/soap/encoding/">
   <SOAP-ENV:Body>
      <m:GetInitialTreeXML xmlns:m="Some-URI">
         <Taxonomy>Directory</Taxonomy>
            <Level>LastName</Level>
            <Selected>19</Selected>
            <NumLevelsDownload>1</NumLevlesDownlaod>
      </m:GetInitialTreeXML>
   </SOAP-ENV:Body>
</SOAP-ENV:Envelope>
```

The web service responds with a SOAP response such as shown below. The response includes the data and identifies whether or not the data should be selectable/multi-selectable, how many levels to download on the next request, and the next level to download.

```
<SOAP-ENV:Envelope
xmlns:SOAP-ENV="http://schemas.xmlsoap.org/soap/envelope/"
SOAP-ENV:encodingStyle=
"http://schemas.xmlsoap.org/soap/encoding/"/>
   <SOAP-ENV:Body>
      <m:GetTreeXMLResponse xmlns:m="Some-URI">
         <LastName id="872">Saan, Aaron</LastName>
         <LastName id="873">Sable, John</LastName>
         <LastName id="874">Sale, Melissa</LastName>
         <LastName id="875">Seamus, Moran</LastName>
         <LastName id="876">Sehorn, Lyle</LastName>
         <LastName id="877">Seik, Hieldegar</LastName>
         <LastName id="878">Simpson, Kyle</LastName>
           <LastName id="879">Slade, Art</LastName>
         <LastName id="880">Smith, Timothy</LastName>
         <LastName id="881">Smith, Christina</LastName>
         <LastName id="882">Smithson, Tom</LastName>
         <LastName id="883">Smythe, Jennifer</LastName>
         <LastName id="884">Snow, Eric</LastName>
         <LastName id="885">Stevenson, Lou</LastName>
         <LastName id="886">Svenson, Matt</LastName>
         <LastName id="887">Swan, Chelsie</LastName>
         <Selectable>1</Selectable>
         <MultiSelect>1</MultiSelect>
         <NextLevel>ContactInfo</NextLevel>
         <NextNumLevelsDownload>1<NextNumLevelsDownload>
      </m:GetTreeXMLResponse>
   </SOAP-ENV:Body>
</SOAP-ENV:Envelope>
```

From this point, the user could either navigate deeper into the hierarchy or make a selection here. In one embodiment, the selection is stored as a list of IDs separated by semicolons where each ID corresponds to a selected node. The client application program would initiate an action based on the list of IDs.

In alternatives of the above example, if the data in the database had the NumLevels (to download) property set to 3, then the entire XML structure would have been downloaded initially (including a ContactInfo level not shown in the above example). Such a setting downloads three levels with one call, downloads one level with a second call, and downloads another three levels with a third call. This enables bandwidth efficiency.

If multiple levels were downloaded, the Selectable and MultiSelect fields would contain a binary string identifying the selectable levels. If the tree control software downloaded three levels at once, then the Selectable field would appear as <Selectable>011<Selectable>. Such a setting indicates that the Letter level would not be selectable but that both the LastName and ContactInfo levels would be selectable. In some cases the Selectable field allows the user to display levels that may have no data, but act as a navigation aid. In the example above, if numeric data for the selected nodes was returned from the web service, there might not be any data for the "Letter" level. However, displaying the "Letter" level aids the user in navigation and bandwidth conservation.

If the tree control software downloaded three levels at once, then the MultiSelect field would appear as <MultiSelect>011</MultiSelect>. The MultiSelect field value does not necessary need to be identical to the Selectable field value. In this example, the user can select many LastNames or ContactInfos to initiate an action. Such a selection ability reduces repetitive actions in that the user selects all the nodes of interest in one pass (rather than repetitive trips through a single-select tree) providing efficient navigation.

In another example, the tree control software provides the ability to download an arbitrary number of levels at any given time and the ability to do multiple-selections at any level.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

APPENDIX A

Details about exemplary events and exposed properties in the tree control of the invention including implementation details are described in this Appendix A. An exposed event entitled "Onchange" is a way to identify if the state of the control has been changed by user action. The tree control raises this event on any selection change triggered by user clicking on a new node or unselecting an existing node. Internally, the event also updates exposed properties viz. Value, Info and Level to effectively represent the current selection state. A software developer or other user can write an event handler for this event to always get the latest state and if needed perform an action based on it.

The exemplary tree control of the invention exposes various methods. A Validate method determines if the tree control is in a valid state. For example, before sending client data to a server, the client can validate the user input by calling the Validate method which returns true if the user input is valid and otherwise returns false. The Validate method uses a configurable property named Required (see below) that accepts a bit value for each level representing the lowest level where a selection needs to be made. For example, assuming the tree has four levels, the Required property can be set with a bit value of "1000" to define that the user needs to at least select a node at the first level.

The exemplary tree control of the invention exposes various properties. A write-only Caption property represents the caption that will be displayed on the display when the entire control is activated. A write-only Width property defines the width of the viewable region of the control in pixels. A write-only Height property defines the height of the viewable region of the control in pixels. A write-only Lastlevel property defines the last level in an XML document that the control should display into the tree view. A write-only Parentpath property defines the level of an XML document where the control should start converting into a tree display. For example, assuming the following valid XML document and assuming the property has a value of "//root/network" then the tree control will start displaying nodes from service and its children's until it reaches the value of the Lastlevel property.

```
<root>
    <network id="1">
        <service id="1"> </service>
            <site id="1"></site>
                <domain id="1">
                    <directory id="1">
                    <directory id="2">
                    <directory id="3">
                <domain id="2">
                <domain id="3">
                <domain id="4">
            <site id="2"></site>
            <site id="3"></site>
        <service id="2"> </service>
            <site id="4"></site>
            <site id="5"></site>
        <service id="3"> </service>
            <site id="6"></site>
            <site id="7"></site>
            <site id="8"></site>
        <service id="4"> </service>
            <site id="15"></site>
    </network>
</root>
```

If the Lastlevel property has a value of "Domain" in the above XML document, then the tree would not show nodes for "directory."

A write-only Multilevel property defines whether the control should allow the user to select nodes at multiple parent levels. This property takes a Boolean input. If a user tries to select nodes at multiple parent levels, an error message is generated and the selection is cancelled. A write-only MultiSelect property defines whether the control should allow the user to select more than one node. This property takes a Boolean input. If the user tries to select multiple nodes, the previous selection is discarded and the current selection saved. A write-only Required property in the tree control defines from which level onwards the user should be allowed to select nodes. For example, in a tree having four levels, a value of "0001" will make the tree control show a checkbox to accept user input only in the last level. This property is also used with Validate method to validate the state of the control. A write-only Backgroundcolor property defines the color to use to set the background view of the tree control. A write-only XMLSourcepath property defines the uniform resource locator (URL) of the data source. That is, the XMLSourcepath property identifies the location of the web service for retrieving data. This can be a URL for a static XML file that may be available on a server or a URL to a web service request to retrieve data. This property is used by the XML parser to request data asynchronously and to generate the tree view on the fly.

A write-only IDattribute property defines the attribute value to use for identifying each node in the tree. To prevent any duplication, the tree control internally pads this attribute value with level identifiers to make it globally unique for the XML document. A value for this property is also returned back to the consumer as an identifier of current selection path. A write-only Nameattribute property defines the attribute value to use for displaying the text along with each node in the tree view. A value for this property is also used to populate a read-only Info property. The Info property exposes a comma separated string of all the node text currently selected. The software developer can get information about the current selection via the Info property. For example, the software developer may display the current selection elsewhere in the user interface or share the current selection with another application program. The value for the Info property is automatically updated on each change event.

The exemplary tree control exposes two properties which are readable and writeable. A read-write Value property allows the consumer to pre-select a set of nodes as a default state for the operation and also query to get a list of IDs for all the selected nodes. The valid format for this property is a set of IDs separated by commas with multiple sets if IDs separated by semicolons. For example, a Value property value of "20,33,26;80,15,5" identifies the paths of two selections made on the $3^{rd}$ level of a displayed hierarchy. The first selection has an ID of 26, its parent has an ID of 33, and the grandparent has an ID of 20. The second selection has an ID of 5, its parent has an ID of 15, and its grandparent has an ID of 80. Additionally, a "*" in the property value (e.g., "20,33,*") implies that the client wants to select all the children under node 33, similar to a drill down effect.

A read-write Level property works in conjunction with the Value property to specify the level of current selection. For example, a Level property value of "Network;Service;Site; Domain" indicates that the displayed hierarchy has four levels including Network, Service, Site and Domain. In this example, the maximum selection is made at the Site level. The Level property value can be used with the Value property value to identify a Network ID, a Service ID, a Site ID, and a Domain ID.

What is claimed is:

1. A computer-implemented method of navigating data, said data associated with a plurality of nodes in a hierarchy stored in a database, said nodes organized in a plurality of levels of the hierarchy, each of said nodes having a label, said method comprising:

requesting a set of labels associated with a plurality of nodes in one or more levels in the hierarchy from the database including a property value for at least one property associated with the hierarchy;

receiving the requested set of labels from the database in accordance with the received property value;

displaying to a user a visual representation of the hierarchy comprising two or more of the labels from the received set of labels in accordance with the received property value;

receiving, from the user, a selection of a first plurality of the displayed labels within a first level and a second plurality of the displayed labels within a second level, each and every of said labels within the first and second levels being selectable separately by the user in the displayed visual representation of the hierarchy; and receiving, from the user, a single request to process and retrieve data associated with the plurality of nodes corresponding to only the selected, displayed labels within the first and second levels and wherein the requesting, the receiving the requested set of labels, and the displaying occur in accordance with the property value to inhibit large amounts of data from being requested or displayed at once, wherein the property value identifies one or more of the following:
- a location of a web service for retrieving the data associated with the plurality of nodes;
- a maximum quantity of labels to request, a maximum quantity of labels to display, or both;
- one or more labels to exclude from requesting or displaying or both;
- an intermediate level to display between other levels within the hierarchy; and
- a quantity of levels to request when requesting a set of labels associated with the plurality of nodes in one or more levels in the hierarchy from the database.

2. The method of claim 1, further comprising providing a visual indication to the user indicating selection of the selected labels, said visual indication located proximal to the selected labels in the visual representation of the hierarchy.

3. The method of claim 1, further comprising retrieving the data associated with the nodes corresponding to the selected labels in response to the user selecting the first plurality and the second plurality of the displayed labels in the displayed visual representation of the hierarchy.

4. The method of claim 1, wherein each of the nodes corresponding to the selected labels has one or more child nodes.

5. The method of claim 1, wherein each of the nodes corresponding to the selected labels has no child nodes and a plurality of the nodes corresponding to the selected labels have different parent nodes.

6. The method of claim 1, wherein the nodes corresponding to the selected labels comprise a node having one or more child nodes and a node having no child nodes.

7. The method of claim 1, wherein requesting and receiving occur via a network.

8. The method of claim 1, wherein displaying comprises displaying to a user a visual representation of the hierarchy comprising two or more of the labels from the received set of labels in a pop-up window.

9. The method of claim 8, further comprising saving state information associated with the pop-up window and deactivating the pop-up window in response to user input.

10. The method of claim 1, further comprising generating an error if the value for the property is invalid.

11. The method of claim 1, wherein the value for the property identifies one or more labels to exclude from requesting or displaying or both.

12. The method of claim 1, wherein the value for the property specifies an intermediate level to display between other levels within the hierarchy.

13. The method of claim 1, wherein the value for the property identifies a quantity of levels to request when requesting a set of labels associated with the plurality of nodes in one or more levels in the hierarchy from the database.

14. The method of claim 1, wherein displaying comprises displaying to a user a visual representation of the hierarchy comprising the first plurality and the second plurality of labels from the received set of labels via a hypertext markup language.

15. The method of claim 1, further comprising expanding or collapsing the visual representation of the hierarchy in response to one or more requests from the user to expand or collapse, respectively, the visual representation of the hierarchy.

16. The method of claim 1, wherein displaying comprises displaying to a user a visual representation of the hierarchy comprising the first plurality and the second plurality of labels from the received set of labels on a computing device selected from a group consisting of a personal digital assistant, a cellular telephone, and a laptop computer.

17. The method of claim 1, wherein requesting comprises iteratively requesting a set of labels associated with the plurality of nodes in one or more levels in the hierarchy from the database in response to user input.

18. The method of claim 1, wherein an applet performs the method of claim 1.

19. The method of claim 1, wherein one or more computer storage media have computer-executable instructions for performing the method of claim 1, further comprising executing said computer-executable instructions to implement said requesting, said receiving the requested set of labels, said displaying, said receiving the selection, and said receiving the single request.

20. In a computer system having a graphical user interface including a display and a user interface selection device, a method of navigating data, said data associated with a plurality of nodes in a hierarchy stored in a database, said nodes organized in a plurality of levels of the hierarchy, each of said nodes having a label, said method comprising:
- requesting a set of labels associated with a plurality of nodes in one or more levels in the hierarchy from the database including a value for at least one property associated with the hierarchy;
- receiving the requested set of labels from the database in accordance with the received property value;
- receiving an activation request from a user via the user interface selection device to display the received set of labels as a hierarchy;
- displaying to a user a visual representation of the hierarchy on the display in response to the received activation request in accordance with the received property value, said displayed hierarchy comprising two or more of the labels from the received set of labels;
- receiving, from the user, a selection of a first plurality of the displayed labels within a first level and a second plurality of the displayed labels within a second level, each and every of said labels within the first and second levels being selectable separately by the user in the displayed visual representation of the hierarchy via the user interface selection device; and
- receiving, from the user, a single request to process and retrieve data associated with the plurality of nodes corresponding to only the selected, displayed labels within the first and second levels and wherein the requesting, the receiving the requested set of labels, and the displaying occur in accordance with the property value to inhibit large amounts of data from being requested or displayed at once, wherein the property value identifies one or more of the following:
  - a location of a web service for retrieving the data associated with the plurality of nodes;
  - a maximum quantity of labels to request a maximum quantity of labels to display, or both;
  - one or more labels to exclude from requesting or displaying or both;

an intermediate level to display between other levels within the hierarchy; and a quantity of levels to request when requesting a set of labels associated with the plurality of nodes in one or more levels in the hierarchy from the database.

21. The method of claim 20, further comprising:

receiving one or more update requests from the user via the user interface selection device to expand or collapse the visual representation of the hierarchy displayed on the display; and for each of the update requests, expanding or collapsing the visual representation of the hierarchy displayed on the display in accordance with the update request.

22. The method of claim 20, wherein the hierarchy has a root node, and further comprising displaying a visual indication in the visual representation of the hierarchy on the display near each label in a path from a label associated with the root node to each of the selected labels to indicate the path to each selected label.

23. The method of claim 20, wherein the visual representation of the hierarchy is displayed in a pop-up window on the display.

24. The method of claim 20, wherein an applet performs the method of claim 22.

25. The method of claim 20, wherein one or more computer storage media have computer-executable instructions for performing the method of claim 20, further comprising executing said computer-executable instructions to implement said requesting, said receiving the requested set of labels, said receiving the activation request, said displaying, said receiving the selection, and said receiving the single request.

26. A computer-readable storage medium having computer-executable components for navigating data, said data associated with a plurality of nodes in a hierarchy stored in a database, said nodes organized in a plurality of levels of the hierarchy, each of said nodes having a label, said components comprising:

a service component for requesting and receiving a set of labels associated with a plurality of nodes in one or more levels in the hierarchy from the database, said requests including a value for at least one property associated with the hierarchy;

a user interface component for displaying to a user a visual representation of the hierarchy comprising two or more of the labels from the received set of labels requested and received by the service component; and a list component for allowing the user to individually select each and every of a first plurality of the displayed labels within a first level and of a second plurality of the displayed labels within a second level in the visual representation of the hierarchy displayed with the user interface component, wherein the user interface component further receives a single request from the user to process and retrieve data associated with the plurality of nodes corresponding to only the selected, displayed labels within the first and second levels, and wherein the requesting, receiving, and displaying occur in accordance with the received value to prevent large amounts of data from being requested or displayed at once, wherein the property identifies one or more of the following:

a location of a web service for retrieving the data associated with the plurality of nodes;

a maximum quantity of labels to request a maximum quantity of labels to display, or both;

one or more labels to exclude from requesting or displaying or both;

an intermediate level to display between other levels within the hierarchy; and a quantity of levels to request when requesting a set of labels associated with the plurality of nodes in one or more levels in the hierarchy from the database.

27. The computer-readable storage medium of claim 26, wherein the service component retrieves the data associated with the nodes selected with the list component, said retrieved data displayed with the user interface component.

28. A computer-readable storage medium having stored thereon a data structure for navigating data, said data associated with a plurality of nodes in a hierarchy stored in a database, said nodes organized in a plurality of levels of the hierarchy, each of said nodes having a label, said data structure comprising:

a service field storing a set of labels representing a plurality of nodes in one or more levels in the hierarchy, said set of labels received from the database in response to a request including a value for at least one property associated with the hierarchy;

a user interface field storing two or more of the labels from the set of labels stored in the service field, said two or more of the labels displayed to the user in a visual representation of the hierarchy in accordance with the received property value; and a list field storing a first plurality and a second plurality of the two or more labels stored in the user interface field, said first plurality being within a first level and said second plurality being within a second level, each and every of said first plurality and said second plurality of labels being selected separately by the user in the visual representation of the hierarchy, said first plurality and said second plurality of the labels being processed responsive to a single request from the user to retrieve data associated with the plurality of nodes corresponding to only the selected labels within the first and second levels and wherein requesting, receiving, and displaying occur in accordance with the received value to prevent large amounts of data from being requested or displayed at once, wherein the property identifies one or more of the following:

a location of a web service for retrieving the data associated with the plurality of nodes;

a maximum quantity of labels to request, a maximum quantity of labels to display, or both;

one or more labels to exclude from requesting or displaying or both;

an intermediate level to display between other levels within the hierarchy; and a quantity of levels to request when requesting a set of labels associated with the plurality of nodes in one or more levels in the hierarchy from the database.

29. The computer-readable storage medium of claim 28, wherein at least one label is added to or deleted from the set of labels stored in the service field in response to a request from the user to expand or collapse, respectively, the visual representation of the hierarchy.

30. The computer-readable storage medium of claim 28, wherein at least one label is added to or deleted from the set of labels stored in the user interface field in response to a request form the user to expand or collapse, respectively, the visual representation of the hierarchy.

* * * * *